(12) United States Patent
Takemoto

(10) Patent No.: US 7,034,959 B1
(45) Date of Patent: Apr. 25, 2006

(54) METHOD, APPARATUS AND RECORDING MEDIUM FOR IMAGE PROCESSING

(75) Inventor: Fumito Takemoto, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 1079 days.

(21) Appl. No.: 09/712,290

(22) Filed: Nov. 15, 2000

(30) Foreign Application Priority Data

Nov. 15, 1999 (JP) ............................... 11-324105
Oct. 27, 2000 (JP) ............................ 2000-329067

(51) Int. Cl.
*G06F 15/00* (2006.01)

(52) U.S. Cl. .................. 358/1.9; 358/2.1; 358/3.1; 358/3.23; 358/518; 358/520; 382/167

(58) Field of Classification Search ................ 358/1.9, 358/2.1, 3.1, 3.23, 518, 520; 382/167
See application file for complete search history.

(56) References Cited

U.S. PATENT DOCUMENTS

| | | | | |
|---|---|---|---|---|
| 4,929,978 A | * | 5/1990 | Kanamori et al. | ............ 355/38 |
| 5,680,230 A | * | 10/1997 | Kaburagi et al. | ........... 358/520 |
| 5,847,847 A | * | 12/1998 | Kosaka | ........................ 358/508 |
| 5,889,596 A | * | 3/1999 | Yaguchi et al. | ............. 358/448 |
| 5,946,411 A | * | 8/1999 | Yamaguchi | ................... 382/162 |
| 6,415,053 B1 | * | 7/2002 | Norimatsu | .................... 382/199 |
| 6,449,060 B1 | * | 9/2002 | Kawai et al. | ................. 358/1.9 |
| 6,473,535 B1 | * | 10/2002 | Takaoka | ..................... 382/274 |
| 6,480,300 B1 | * | 11/2002 | Aoyama | ..................... 358/1.9 |
| 6,603,878 B1 | * | 8/2003 | Takemoto | .................... 382/167 |
| 6,693,731 B1 | * | 2/2004 | Ohnuma et al. | ............ 358/529 |
| 6,697,537 B1 | * | 2/2004 | Norimatsu | .................... 382/275 |
| 2002/0004183 A1 | * | 1/2002 | Ishikawa et al. | ............. 430/359 |

* cited by examiner

*Primary Examiner*—Mark Wallerson
*Assistant Examiner*—Michael Burleson
(74) *Attorney, Agent, or Firm*—Birch Stewart Kolasch & Birch LLP

(57) ABSTRACT

Upon conversion of density and/or tone of an image, an impression of a specific color in the image is also corrected. Tone conversion is carried out in a CMY color space on image data having been subjected to logarithmic conversion, and density conversion processing is also carried out thereon in density conversion means. The image data are then subjected to inverse logarithmic conversion. In LCH conversion means, the image data are converted into lightness, saturation and hue, and the saturation and/or the hue are corrected by color impression correction means. By converting the data into RGB data by using RGB conversion means, processed image data are obtained.

18 Claims, 9 Drawing Sheets

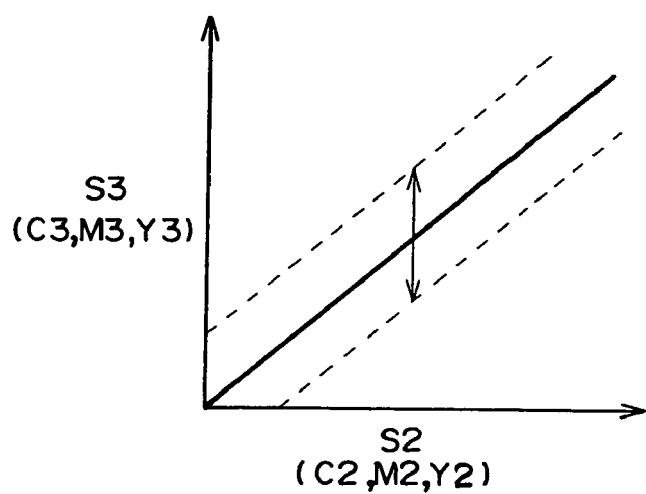
F I G . 3

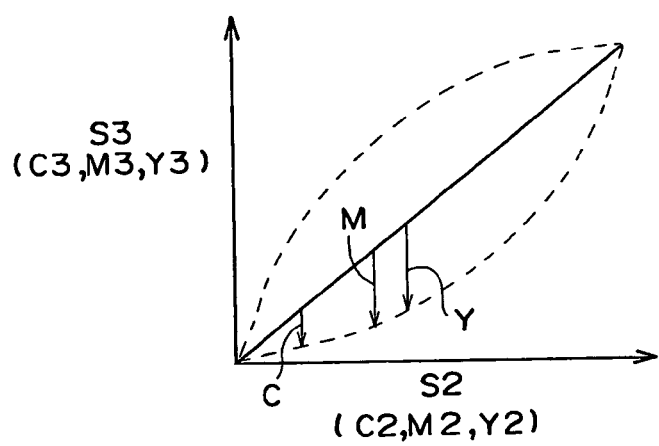
F I G. 5

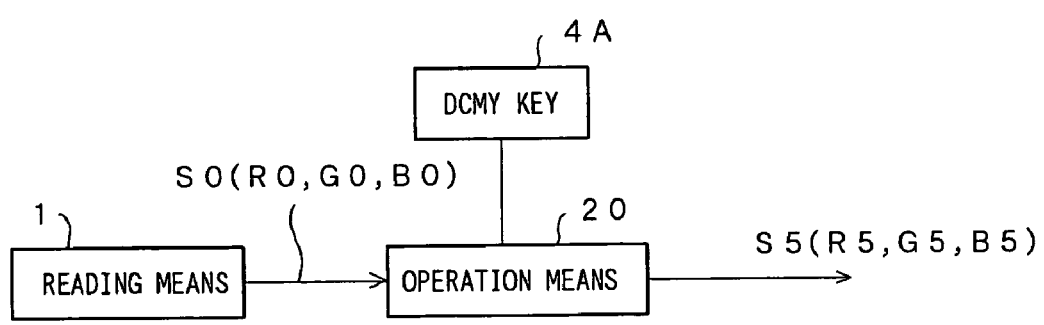
F I G. 9

METHOD, APPARATUS AND RECORDING MEDIUM FOR IMAGE PROCESSING

BACKGROUND OF THE INVENTION

1. Field of the Invention

The present invention relates to a method and an apparatus for carrying out image processing for changing density and tone of digital color image data obtained by a digital camera or a scanner. The present invention also relates to a computer-readable recording medium storing a program to cause a computer to execute the image processing method.

2. Description of the Related Art

Image processing systems for reproducing digital image data obtained by digital still cameras (hereinafter called digital camera) and digital image data obtained by reading images recorded on films as hard copies such as prints or as soft copies on display screens have been proposed. In such an image processing system, digital image data are also provided by being recorded in a recording medium such as a CD-R. In the case where such an image obtained by a digital camera or a scanner is printed, the image is expected to have as high a quality as a photograph printed from a negative film.

For this reason, printing is carried out after image processing for correcting a density and a tone of digital image data has been carried out. Especially, in the case where an image includes a person, image processing is carried out on image data so as to change a skin color to have an adequate density or tone, since the skin color is a substantially important color. For example, in an image photographed by using flash, a skin color looks too light in some cases, and the skin color can be darkened by increasing the density of the image. Furthermore, in the case of a dark skin color caused by backlight, the skin color can be lightened by decreasing the density.

However, although the skin color can be darkened by increasing the density, saturation also decreases and the skin color does not give a favorable impression. Furthermore, if the density is decreased in such a manner that a tone curve for changing the tone is downwardly convex, the skin color looks bluish, also giving an impression of being unhealthy. As has been described above, changing the density and the tone of an image leads to reproduction of a dull color in the image.

SUMMARY OF THE INVENTION

The present invention has been conceived based on consideration of the above problems. An object of the present invention is therefore to provide an image processing method and an image processing apparatus enabling maintenance of an impression of a specific color in an image while changing the density and/or tone thereof, and to provide a computer-readable recording medium storing a program to cause a computer to execute the image processing method.

A first image processing method of the present invention is a method of obtaining processed image data by carrying out image processing to change density and/or tone on color image data, and the method comprises the steps of:

changing the density and/or the tone of an image represented by the color image data in a first color space; and obtaining the processed image data by converting saturation and/or hue of a specific color in the image in a second color space different from the first color space.

A second image processing method of the present invention is a method of obtaining processed image data by carrying out image processing to change density and tone on color image data. The second image processing method comprises the steps of:

carrying out conversion of the density followed by conversion of the tone of an image represented by the color image data in a first color space; and obtaining the processed image data by carrying out correction of a change in saturation and/or hue of a specific color in the image caused by the conversion of the tone, in a second color space different from the first color space.

In the second image processing method of the present invention, it is preferable for the correction to be carried out so as to change the saturation and/or the hue of the specific color to become saturation and/or hue of the specific color in the image after the conversion of the density.

"To change density" refers to a uniform shift of all data of the density in the color image by carrying out multiplication or addition or subtraction of a uniform value with the data. In the case where the color image data are represented by an amount of light, the data are multiplied by the uniform value. In the case where the color image data are represented by density, the uniform value is added to or subtracted from the data. Furthermore, "to change tone" refers to changing all the data of the color image by using a method other than the multiplication, addition, or subtraction of the uniform value. For example, the data may be changed by variously changing a slope of a tone conversion curve (a straight line) representing a relationship between input values and output values of the data. Alternatively, the data may be changed by using a tone conversion curve to cause the input values and the output values to have a nonlinear relationship being downwardly convex or upwardly convex. The data may be shifted by a uniform value and changed at the same time by using a tone conversion curve to cause a highlight portion and/or a shadow portion to become nonlinear.

As "the fist color space", a color space such as an RGB color space which cannot define a specific color, but with which it is easy to change the density and the tone of the entire image by simply shifting or multiplying pixel values, can be used. As "the second color space", a color space such as an L*a*b* color space or an L*u*v* color space enabling easy definition of a specific color and easy control of saturation and hue can be used. In the RGB color space, an amount of change per unit of digital image data is uniform in all color ranges. However, in the L*a*b* color space or in the L*u*v* color space, the amount of change per unit of digital image data is different in each color range. In other words, in one color range, a change per unit can be substantially large while the change per unit can be substantially small in another color range. Therefore, even if density change or tone change in the L*a*b* color space or in the L*u*v* color space is attempted, a degree of the change in density or tone differs between the color range having a large change per unit and the color range having a small change per unit, since the amount of change becomes different depending on the color range. As a result, when uniform change in the density or the tone is attempted in all colors, an image having been processed in this manner is ruined. For this reason, in the present invention, the density and/or the tone is changed in the first color space such as the RGB color space while the saturation and/or the hue are changed in the second color space such as the L*a*b* color space or the L*u*v* color space.

In the present invention, the change in the density and/or the tone and the change in the saturation and/or the hue may be carried out based on an equation or by referring to a look-up table having been generated in advance.

Furthermore, in the present invention, temporary image data (whose density and/or tone have been changed) may be obtained after the density and/or the tone have been changed, and the processed image data may be obtained by carrying out processing for converting the saturation and/or the hue on the temporary image data. Furthermore, it is preferable for the change of the density and/or the tone, as well as the conversion of the saturation and/or the hue, to be carried out at the same time by using the look-up table. By carrying out the density and/or tone change and the saturation and/or hue conversion by using the look-up table, operation time can be reduced. In the case where the density and/or tone change and the saturation and/or hue conversion are carried out separately by using equations, the saturation and/or the hue cannot be changed adequately for a portion of the temporary image data if the portion is clipped by exceeding a predetermined value or becoming smaller than a predetermined value. However, if the look-up table is used to convert the density and/or the tone and the saturation and/or the hue at the same time, no temporary image data are generated, and clipping does not occur. Therefore, the processed image data enabling reproduction of the image having adequate saturation and/or hue can be obtained.

A first image processing apparatus of the present invention is an apparatus for obtaining processed image data by carrying out image processing for converting density and/or tone on color image data, and the image processing apparatus comprises:

first conversion means for converting the density and/or the tone of an image represented by the color image data in a first color space; and second conversion means for obtaining the processed image data by converting saturation and/or hue of a specific color in the image in a second color space different from the first color space.

In the first image processing apparatus, the first conversion means and the second conversion means may comprise common means.

A second image processing apparatus of the present invention is an apparatus for obtaining processed image data by carrying out image processing to change density and tone on color image data, and the second image processing apparatus comprises:

first conversion means for carrying out conversion of the density followed by conversion of the tone of an image represented by the color image data; and second conversion means for obtaining the processed image data by carrying out correction of a change in saturation and/or hue of a specific color in the image caused by the conversion of the tone, in a second color space different from the first color space.

In the second image processing apparatus of the present invention, it is preferable for the second conversion means to carry out the correction so as to cause the saturation and/or the hue of the specific color to become saturation and/or hue of the specific color in the image after the conversion of the density.

In the second image processing apparatus, the first conversion means and the second conversion means may comprise common means.

The first and second image processing methods of the present invention may be provided as a computer-readable recording medium storing a program to cause a computer to execute the image processing method.

According to the present invention, the density and/or the tone are converted in the first color space. Therefore, the density and/or the tone of the color image data can be changed without ruining the image. Furthermore, for the specific color in the image, the saturation and/or the hue thereof are changed in the second color space. Therefore, the specific color can be changed to have a desired saturation and/or hue. Consequently, in a reproduced image obtained by reproduction of the processed image data, the desired density and/or tone as well as the desired saturation and/or hue, that is, the desired color impression of the specific color can be realized.

BRIEF DESCRIPTION OF THE DRAWINGS

FIG. 3 is a diagram showing a tone curve;

FIG. 5 is a diagram showing another example of the density shift;

FIG. 9 is a block diagram showing an outline configuration of an image processing apparatus according to a third embodiment of the present invention.

DESCRIPTION OF THE PREFERRED EMBODIMENTS

Hereinafter, embodiments of the present invention will be explained with reference to the accompanying drawings.

Figure 1:
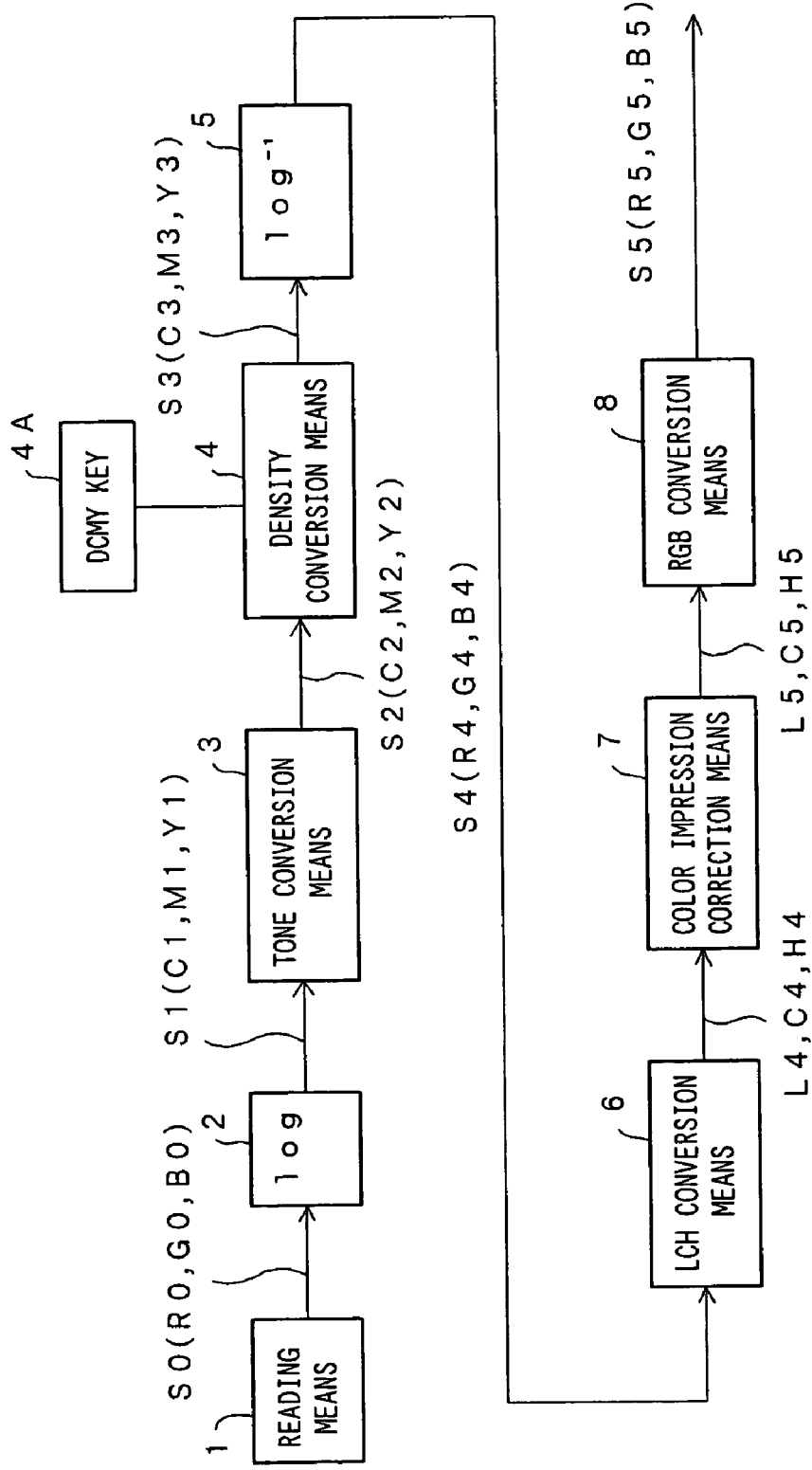
FIG. 1 is a block diagram showing an outline configuration of an image processing apparatus according to a first embodiment of the present invention.

FIG. 1 is a block diagram showing an outline configuration of an image processing apparatus according to a first embodiment of the present invention. As shown in FIG. 1, the image processing apparatus obtains processed image data S5 (R5, G5, B5) by carrying out image processing on image data S0 comprising color data R0, G0, and B0 photographed by a digital camera or read by a scanner. The image processing apparatus comprises reading means 1 for reading the image data S0 from a recording medium or for reading the image data S0 transferred via a network, logarithmic conversion means 2 for obtaining image data S1 comprising density values C1, M1 and Y1 in a CMY color space by carrying out logarithmic conversion on the image data S0, tone conversion means 3 for obtaining image data S2 by carrying out processing for converting a tone on the image data S1, density conversion means 4 for obtaining image data S3 by carrying out processing for converting density on the image data S2, inverse logarithmic conversion means 5 for obtaining image data S4 comprising color data R4, G4 and B4 in an RGB color space by carrying out inverse logarithmic conversion on the image data S3, LCH conversion means 6 for converting the color data R4, G4 and B4 comprising the image data S4 into data L4, C4 and H4 representing a lightness L*, a chroma C* and a hue angle HA, color impression correction means 7 for obtaining processed data L5, C5, and H5 by carrying out processing for correcting a color impression on the data L4, C4 and H4, and RGB conversion means 8 for obtaining the processed image data S5 comprising color data R5, G5 and B5 by converting the processed data L5, C5 and H5 into an RGB color space.

In the first embodiment, an amount of change between a skin-color impression obtained by only converting the tone by using the tone conversion means 3 according to a basic tone curve which will be explained later, and a skin-color impression obtained by converting the tone according to the basic tone curve and by converting the density by using the density conversion means is found, and the amount of change is corrected by the color impression correction means 7.

Therefore, the density conversion means 4 and the color impression correction means 7 in the first embodiment respectively correspond to the first conversion means and the second conversion means of the present invention.

Figure 2:
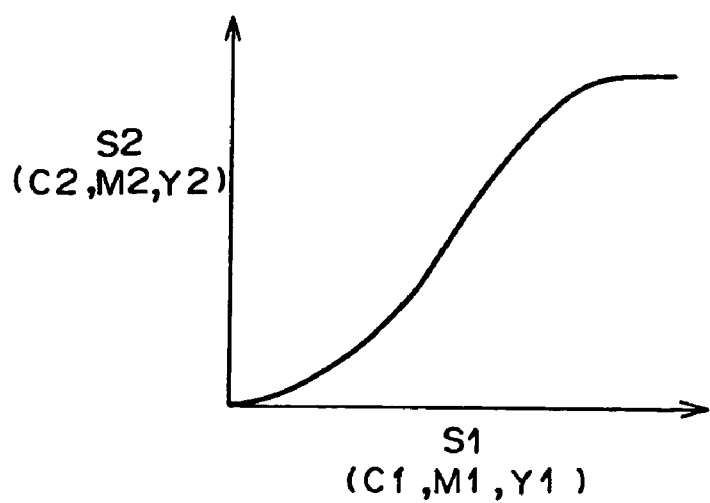
FIG. 2 is a diagram for explaining density shift.

The tone conversion means 3 obtains the image data S2 comprising density values C2, M2 and Y2 by converting the image data S1 comprising the density values C1, M1 and Y1 according to the basic tone conversion curve, such as a curve shown in FIG. 2, for example. The basic tone conversion curve has an "S"-like shape, and has a slope of 1.5 in a middle density range.

The density conversion means 4 is connected to a DCMY key 4A for correcting a density D of the entire image and densities of C (Cyan), M (Magenta) and Y (Yellow). By operating the DCMY key 4A, the density D of the image, and the densities of C, M, and Y are changed according to how many times the key is pressed down.

In the density conversion means 4, a uniform value is added to or subtracted from the density values C2, M2, and Y2 of the image data S2 having been subjected to the tone conversion, as shown in FIG. 3. In other words, the density is changed linearly by shifting the density values C2, M2 and Y2, and the image data S3 comprising density values C3, M3 and Y3 are obtained. For example, in the case where the image represented by the image data S0 is dark, the density is shifted downward of FIG. 3 in order to cause the image to look lighter. This processing is expressed in an antilogarithmic space by Equation (1) below:

$R3=\alpha R2$ $G3=\alpha G2$ $B3=\alpha B2$ (1)

where α is a coefficient determined according to the number of times the key is pressed down (α>1), R2, G2, and B2 are antilogarithmic values of the density values C2, M2, and Y2, and R3, G3, and B3 are antilogarithmic values of the density values C3, M3, and Y3.

Meanwhile, in the case where the image represented by the image data S0 is light, the density is shifted upward of FIG. 3 in order to cause the image to look darker. This processing is expressed by the above Equation (1) with α being α<1. The density is shifted by multiplying the antilogarithmic color data R2, G2 and B2 by the coefficient α according to Equation (1), for the sake of easier explanation below. In the case where the image data S2 are expressed by the density values C2, M2 and Y2, a density shift corresponding to the coefficient α is added to or subtracted from the density values C2, M2 and Y2 in order to shift the density.

The processing in the tone conversion means 3 and in the density conversion means 4 is carried out in the CMY color space.

The LCH conversion means 6 converts the image data S4 obtained by the inverse logarithmic conversion of the image data S3 from the RGB color space into an L*a*b* color space, and obtains the data L4, C4 and H4 representing the lightness L*, the saturation (chroma) C* and the hue angle HA respectively. Hereinafter, this conversion will be explained. If the image data S0 read by the reading means 1 are according to the ITU-R BT.709(REC.709) standard, the color data R4, G4 and B4 comprising the image data S4 are converted into CIE1931 tristimulus values X, Y, and Z according to Equations (2) to (4) below:

$Pr=R4/255$ $Gr=G4/255$ $Pb=B4/255$ (2)

$R4'=((Pr+0.099)/1.099)^{2.222}$ $G4'=((Pg+0.099)/1.099)^{2.222}$ (if Pr, Pg, Pb≥0.081)

$B4'=((Pb+0.099)/1.099)^{2.222}$ (3)

$R4=Pr/4.5$ $G4=Pg/4.5$ (if pr, Pg, Pb<0.081)

$B4=Pb/4.5$ (3')

$$\begin{pmatrix} X \\ Y \\ Z \end{pmatrix} = |A| \cdot \begin{pmatrix} R4' \\ G4' \\ B4' \end{pmatrix}$$ (4)

where the matrix |A| is a matrix for converting the color data R4', G4' and B4' into the tristimulus values X, Y, and Z, and values below are used for the matrix, for example:

$$|A| = \begin{pmatrix} 0.4124 & 0.3576 & 0.1805 \\ 0.2126 & 0.7152 & 0.0722 \\ 0.0913 & 0.1192 & 1.0571 \end{pmatrix}$$ (5)

The tristimulus values X, Y, and Z may be found by using a look-up table instead of the matrix |A|.

Based on Equations (6) to (8) below, the CIE1976 L*(=L4), the chroma C*(=C4), and the hue angle HA(=H4) are found:

$a*=5\{f(X/Xn)-f(Y/Yn)\}$ $b*=200\{f(Y/Yn)-f(Z/Zn)\}$ $L*=116(Y/Yn)^{1/3}-16$ (if Y/Yn>0.008856)

$L*=903.25(Y/Yn)$ (if Y/Yn≤0.008856) (6)

where
 $f(a/an)=(a/an)^{1/3}$ (a=X, Y, Z) if X/Xn, Y/Yn, Z/Zn>0.008856, and
 $f(a/an)=7.787(a/an)+16/116$ if X/Xn, Y/Yn, Z/Zn≤0.008856

Xn, Yn and Zn are tristimulus values for white and can be substituted by tristimulus values corresponding to CIE-D65 (a light source whose color temperature is 6500K).

$$C^* = (a^{*2} + b^{*2})^{1/2} \quad (7)$$

$$HA = \tan^{-1}(b^*/a^*) \quad (8)$$

Let tristimulus values obtained by converting the image data S2 before the density shift according to Equation (1) (only the tone has been converted) by using Equations (2) to (4) be X2, Y2, Z2 and let tristimulus values after the density shift be X3, Y3, Z3. Equation (9) below is then obtained:

$$\begin{vmatrix} X3 \\ Y3 \\ Z3 \end{vmatrix} = |A| \cdot \begin{vmatrix} R4' \\ G4' \\ B4' \end{vmatrix} = \alpha |A| \cdot \begin{vmatrix} R2 \\ G2 \\ B2 \end{vmatrix} = \alpha \cdot \begin{vmatrix} X2 \\ Y2 \\ Z2 \end{vmatrix} \quad (9)$$

Therefore, the chroma $C^*$ is found based on Equation (6) by using the coefficient $\alpha$ (if $X/Xn$, $Y/Yn$, $Z/Zn > 0.008856$)

$$a^* = 500\{(\alpha X/Xn)^{1/3} - (\alpha Y/Yn)^{1/3}\} \quad (10)$$
$$= \alpha^{1/3} 500\{(X/Xn)^{1/3} - (Y/Yn)^{1/3}\}$$

$$b^* = 200\{(\alpha Y/Yn)^{1/3} - (\alpha Z/Zn)^{1/3}\}$$
$$= \alpha^{1/3} 200\{(Y/Yn)^{1/3} - (Z/Zn)^{1/3}\}$$

Therefore, the following Equation is obtained:

$$C^* = \alpha^{1/3}(a^{*2} + b^{*2})^{1/2} \quad (11)$$

The Equation (11) above refers to a fact that causing the image to become lighter or darker by shifting the density in the RGB color space is equivalent to increasing or decreasing the saturation. In the case where the image is lightened, $\alpha > 1$, and the chroma increases. Therefore, the increase in the saturation is perceived. On the other hand, when the image is darkened, $\alpha < 1$ and the chroma decreases, which leads to perception of the decreased saturation.

Figure 4:
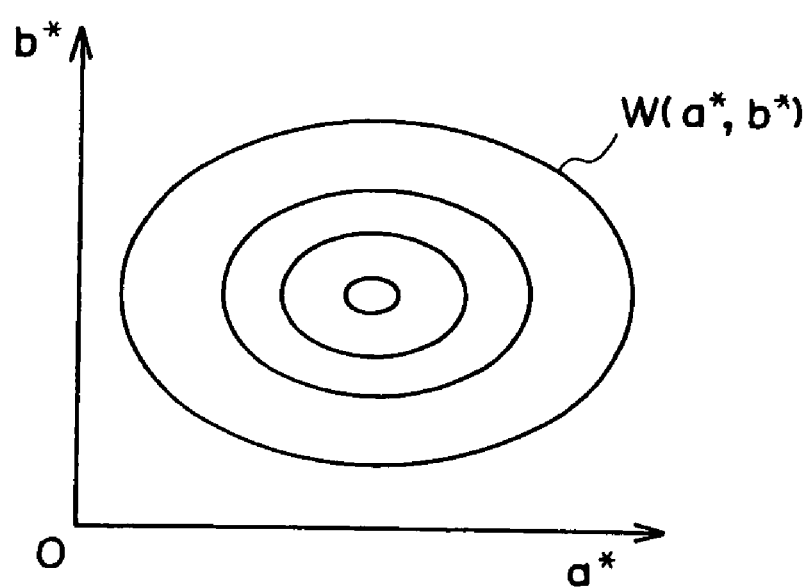
FIG. 4 is a diagram showing a skin-color intensity function in an L*a*b* color space.

In order to correct this phenomenon, a skin-color intensity function $W(a^*, b^*)$ ($0 \leq W(a^*, b^*) \leq 1$) shown in FIG. 4 is defined in the color impression correction means 7. This function takes a smaller value in case the value $a^*$ and $b^*$ is nearer the periphery of a skin-color range in the L*a*b* color space, that is, farther from a skin color and takes a larger value in case the value $a^*$ and $b^*$ nearer the center of the skin-color range, that is, closer to the skin color. The chroma of the skin color range is converted according to Equation (12) below to obtain a converted chroma C1* (=C5):

$$C1^* = (\alpha^{1/3} - 1) \cdot C^* \cdot W(a^*, b^*) + C^* \quad (12)$$

The skin-color intensity function $W(a^*, b^*)$ corresponding to $a^*$ and $b^*$ set as integers may be found in advance. In this case, $a^*$ and $b^*$ found according to Equation (6) are rounded to become integers and a value of the skin-color intensity function $W(a^*, b^*)$ corresponding to the rounded $a^*$ and $b^*$ is selected. Alternatively, the skin-color intensity function $W(a^*, b^*)$ corresponding to arbitrary values of $a^*$ and $b^*$ may be found in advance. In this case, based on $a^*$ and $b^*$ actually found by using Equation (6), the value of the skin-color intensity function $W(a^*, b^*)$ corresponding to the actually calculated values $a^*$ and $b^*$ is found by carrying out an interpolation operation on the skin-color intensity function $W(a^*, b^*)$ found in advance.

The RGB conversion means 8 finds $a^*$ and $b^*$ after the conversion by solving Equations (7) and (8) for $a^*$ and $b^*$, based on the converted chroma C1* (=C5) and the hue angle HA (HA=H5, although HA has not been changed here). Based on L*, $a^*$ and $b^*$ after the conversion, the tristimulus values X5, Y5, and Z5 are found by solving Equation (6).

The tristimulus values X5, Y5, and Z5 are then converted into color data R5', G5' and B5' according to Equation (13) below:

$$\begin{vmatrix} R5' \\ G5' \\ B5' \end{vmatrix} = |A|^{-1} \cdot \begin{vmatrix} X5 \\ Y5 \\ Z5 \end{vmatrix} \quad (13)$$

Furthermore, the color data R5, G5, and B5 are found by Equation (14) below and the color data R5, G5 and B5 are used as the processed image data S5:

$$R5 = 255 \times (1.099 R5'^{0.45} - 0.099)$$

$$G5 = 255 \times (1.099 G5'^{0.45} - 0.099)(\text{if } 0.018 \leq R5', G5', B5' \leq 1)$$

$$B5 = 255 \times (1.099 B5'^{0.45} - 0.099)$$

$$R5 = 255 \times 4.500 R5'$$

$$G5 = 255 \times 4.500 G5'(\text{if } 0 \leq R5', G5', B5' < 0.018)$$

$$B5 = 255 \times 4.500 B5' \quad (14)$$

In the first embodiment, the density conversion means 4 linearly changes the density by uniformly shifting the density. The density conversion means 4 may also change the density to become nonlinear, that is, the density conversion means 4 may carry out tone conversion. For example, in the case where the image represented by the image data S0 is dark, the image can be lightened by converting the tone to be nonlinear and downwardly convex with a highlight portion and a shadow portion being fixed as shown in FIG. 5. Meanwhile, if the tone is changed to be nonlinear and upwardly convex, the image can be darkened. By this processing, the skin color can be expressed by Equation (15) below in the antilogarithmic space:

$$R3 = \alpha R2$$

$$G3 = \beta G2$$

$$B3 = \gamma B2 \quad (15)$$

where $\alpha$, $\beta$, $\gamma$ are coefficients determined according to how many times the key is pressed down, and $\gamma > \beta > \alpha > 1$ (in the case where the image is changed to become lighter). In other words, color balance of a skin color is generally C>M>Y in the CMY color space, and amounts of the changes in C, M, and Y exhibit a relationship C<M<Y as shown by arrows in FIG. 5 when the tone is converted to become downwardly convex. Therefore, $\gamma > \beta > \alpha > 1$. On the contrary, $0 < \gamma < \beta < \alpha < 1$ when the image is darkened.

When the tone is converted nonlinearly in the above manner, chroma $C^*$ found in Equation (7) does not change uniformly in accordance with the change in the tone. Furthermore, not only the chroma $C^*$ but also the hue angle HA found by Equation (8) change. Therefore, when the tone is changed nonlinearly, a change ΔC in the chroma C* and a change ΔHA in the hue angle HA for each pixel of the skin color are found according to Equation (6) to (8) using the tristimulus values X, Y, and Z before and after the tone conversion. As shown by Equation (16) and (17) below, these values are multiplied by the value of the skin-color function W(a*,b*) to find the converted chroma C1*(=C5) and the converted hue angle HA1(=H5):

$$C1^* = \Delta C \cdot W(a^*, b^*) + C^* \quad (16)$$

$$HA1 = \Delta HA \cdot W(a^*, b^*) + HA \quad (17)$$

However, in order to find ΔC and ΔHA for each skin-color pixel, it is necessary to calculate the chroma and the hue angle before and after the density shift, which leads to a substantially large operation load. Therefore, it is preferable to generate, in the skin-color range, a table of Δ C and ΔHA depending on a density change ΔD caused by the tone conversion, in order to find the correction with reference to the table. Equations (18) and (19) below show this operation:

$$C1^* = fc(\Delta D)W \cdot (a^*, b^*) + C^* \quad (18)$$

$$HA1 = fh(\Delta D)W \cdot (a^*, b^*) + HA \quad (19)$$

where fc(ΔD) is the change ΔC in the chroma in the skin-color range and fh(ΔD) is the change ΔHA in the hue angle in the skin-color range.

Based on the converted chroma C1* (=C5) and the converted hue angle HA1 (=H5), the RGB conversion means 8 finds a* and b* after the conversion by solving Equations (7) and (8). Based on a* and b* after the conversion as well as L*, the tristimulus values X5, Y5, and Z5 after the conversion are then found by solving Equation (6). The color data R5, G5 and B5 are found based on Equations (13) and (14), and the color data R5, G5 and B5 are used as the processed image data S5.

Figure 6:
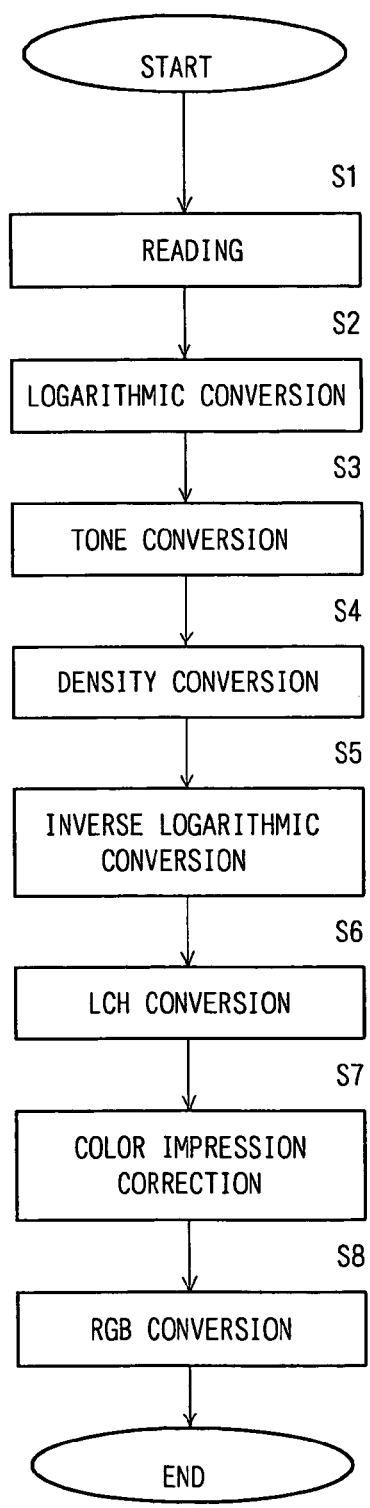
FIG. 6 is a flow chart explaining an operation of the first embodiment.

An operation of the first embodiment will be explained next. FIG. 6 is a flow chart showing the operation of this embodiment. First, the reading means 1 reads the image data S0 and inputs the data to the logarithmic conversion means 2 (Step S1). In the logarithmic conversion means 2, the image data S0 are subjected to the logarithmic conversion and the image data S1 are obtained (Step S2). The image data S1 are subjected to the tone conversion by the tone conversion means 3, and the image data S2 are obtained (Step S3). The image data S2 are then subjected to the density conversion by the density conversion means 4, and the image data S3 are obtained (Step S4). The density conversion means 4 may carry out nonlinear tone conversion. The image data S3 are subjected to the inverse logarithmic conversion by the inverse logarithmic conversion means 5, and the image data S4 are obtained (Step S5).

The image data S4 are then converted into the lightness, the chroma and the hue by the LCH conversion means 6 (Step S6), and the color impression correction means 7 corrects the color impression (Step S7). After this correction, the data of the lightness, the chroma and the hue are converted into the RGB data by the RGB conversion means 8, and the processed image data S5 are obtained (Step S8).

As has been described above, in this embodiment, the density and/or tone are converted in the CMY color space (RBG color space when antilogarithmic values are used). Therefore, without ruining the image, the density of the image data S0 can be changed. For the saturation and/or the hue of the skin color in the image, the conversion is carried out in the L*a*b* color space. Therefore, the desired saturation and/or the hue can be obtained for the skin color. As a result, in the reproduced image obtained by reproduction of the processed image data S5, the desired density and/or tone have been realized and the color impression of the specific color has been changed as desired.

Figure 7:
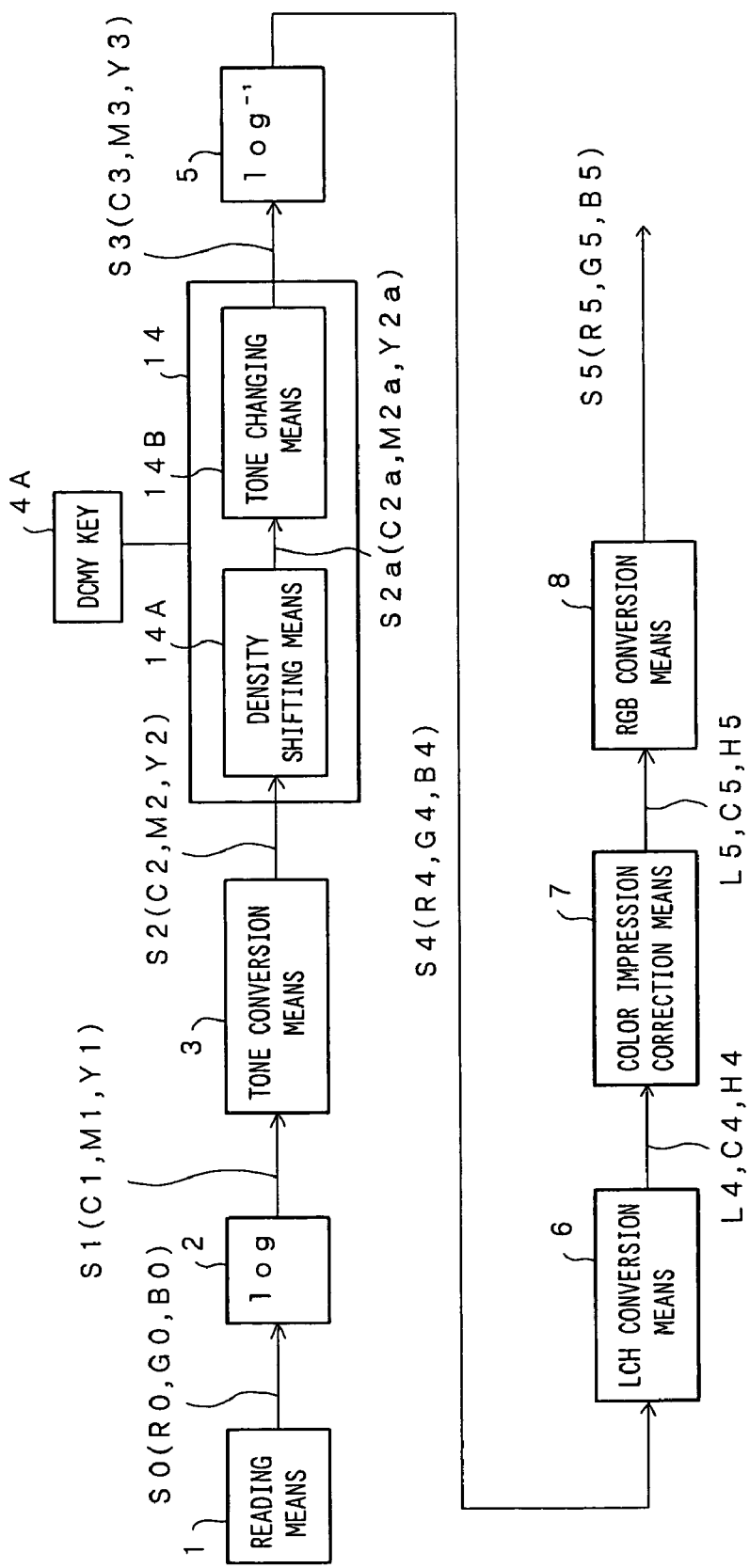
FIG. 7 is a block diagram showing an outline configuration of an image processing apparatus according to a second embodiment of the present invention.

A second embodiment of the present invention will be explained next. FIG. 7 is a block diagram showing an outline configuration of an image processing apparatus according to the second embodiment. In the second embodiment, components the same as in the first embodiment have the same reference numerals and detailed explanation thereof is omitted. In the first embodiment, the density conversion means 4 shifts the density as shown in FIG. 3 or changes the tone as shown in FIG. 5. In the second embodiment, the image processing apparatus comprises density conversion means 14 for changing density as shown in FIG. 3 and then changing a tone as shown in FIG. 8, which is different from the first embodiment.

Figure 8:
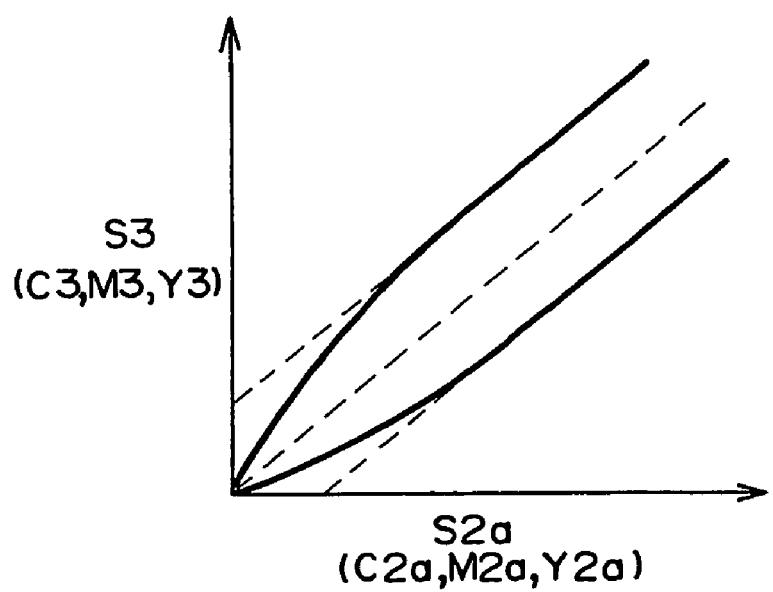
FIG. 8 is a diagram showing a tone conversion curve used in the second embodiment.

Therefore, the density conversion means 14 in the second embodiment comprises density shifting means 14A for obtaining image data S2a by carrying out processing to shift the density on image data S2 as shown in FIG. 3, and tone changing means 14B for obtaining image data S3 by carrying out processing to change the tone as shown in FIG. 8 on the image data S2a. The image data S3 shown by the vertical axis of FIG. 3 are replaced with the image data S2a in the second embodiment.

In the second embodiment, an amount of change between color impression of a skin color after the density shift by the density shifting means 14A and color impression of the skin color obtained by the subsequent tone conversion by the tone changing means 14B is found, and this amount is changed by color impression correction means 7.

In the density shifting means 14A, density values C2, M2, and Y2 of the image data S2 are shifted and the image data S2a comprising density values C2a, M2a, and Y2a are obtained. This processing is expressed by Equation (20) below in an antilogarithmic space:

$$R2a = \alpha R2$$

$$G2a = \alpha G2$$

$$B2a = \alpha B2 \quad (20)$$

where α is a coefficient determined according to how many times a DCMY key 4A is pressed down. In the case where the density is shifted downward in FIG. 3, α>1. On the other hand, α<1 when the density is shifted upward in FIG. 3. R2a, G2a, and B2a are antilogarithmic values of the density values C2a, M2a and Y2a.

In the tone changing means 14B, as shown in FIG. 8, the tone is changed in such a manner that a highlight portion (low density range) of the density values C2a, M2a, and Y2a of the image data S2a becomes nonlinear. By this processing, the skin color is expressed by Equation (21) below in the antilogarithmic space:

$$R3 = \alpha' R2a$$

$$G3 = \beta' G2a$$

$$B3 = \gamma' B2a \quad (21)$$

where α', β', and γ' are coefficients determined according to how many times the DCMY key 4A is pressed down, and γ'>β'>α'>1 when the highlight portion is lightened. On the other hand, when the highlight portion is darkened, 0<γ'<β'<α'<1.

In the case where the tone is converted to become nonlinear as has been described above, a chroma value C* found by Equation (7) above does not change uniformly in accordance with the tone change, as in the case of the tone converted to the nonlinear tone as shown in FIG. 5. Furthermore, not only the chroma value C* but also a hue angle HA calculated by Equation (8) change. Therefore, in the case where the tone is changed to become nonlinear, an amount of change ΔC of the chroma value C* and an amount of change ΔHA in the hue angle HA are calculated for each pixel of the skin color by using Equations (6) to (8) based on tristimulus values X, Y and Z before the tone conversion (found from the image data S2a) and based on tristimulus values X, Y, and Z after the tone conversion (found from the image data S3). A converted chroma value C1* (=C5) and a converted hue angle HA1 (=H5) are then found by multiplying the amount of changes ΔC and ΔHA by a value of a skin-color intensity function W(a*, b*) as shown by Equations (16) and (17) above.

Furthermore, it is preferable for a map between the changes ΔC and ΔHA depending on an amount of change ΔD in the density caused by the tone conversion between the image data S2a and the image data S3 to be generated so that a correction amount can be found by Equations (18) and (19) with reference to the map.

Based on the converted chroma value C1* (=C5) and the converted hue angle HA1 (=H5) that have been calculated in the above manner, a* and b* after the conversion are found by solving Equations (7) and (8) by using RGB conversion means 8. By solving Equation (6) based on L* as well as a* and b* after the conversion, tristimulus values X5, Y5, and Z5 after the conversion are found. Color data R5, G5, and B5 are then found based on Equations (13) and (14) to be used as processed image data S5.

In the first and second embodiments, the image data S4 are converted by the LCH conversion means 6 into the L*a*b* color space. However, the image data may be converted into an L*u*v* space, and the color impression correction means 7 may correct the saturation and the hue in the L*u*v* space.

Furthermore, in the first and second embodiments, the image data S0 are subjected to the processing in the logarithmic conversion means 2, the tone conversion means 3, the density conversion means 4 or 14, the inverse logarithmic conversion means 5, the LCH conversion means 6, the color impression correction means 7 and the RGB conversion means 8. However, a look-up table for simultaneously carrying out the processing by each of the means may be generated in advance so that the processed image data S5 can be obtained by converting the image data S0 by referring to this table. By converting the image data S0 with reference to the look-up table, the amount of calculation can be reduced and the processing can become faster. In this case, as shown by an image processing apparatus according to a third embodiment in FIG. 9, instead of each of the means described above, only operation means 20 for simultaneously carrying out the processing by each of the means described above is used. Therefore, a configuration of the image processing apparatus becomes simpler.

Moreover, in the first and second embodiments, the impression of the skin color is changed. However, an impression of another specific color, such as a color of the sky or a tree, can be corrected as in the case of the skin color.

In addition, all of the contents of Japanese Patent Application Nos. 11(1999)-324105 and 2000-329067 are incorporated into this specification by reference.

What is claimed is:

1. A method of obtaining processed image data by carrying out image processing to change density and tone on color image data, the method comprising the steps of:
   carrying out conversion of the density followed by conversion of the tone of an image represented by the color image data in a first color space; and
   obtaining the processed image data by carrying out correction of a change in saturation and/or hue of a specific color in the image caused by the conversion of the tone, in a second color space different from the first color space.

2. An image processing method as defined in claim 1, wherein the correction is carried out so as to change the saturation and/or the hue of the specific color to become saturation and/or hue of the specific color in the image after the conversion of the density.

3. The method of claim 1 wherein the first color space comprises an RGB color space and wherein said step of carrying out conversion of the density followed by conversion of the tone of an image represented by the color image data in the first color space comprises the step of multiplying antilogarithmic values of each of the R, G and B components of the RGB color space by a constant.

4. The method of claim 1 wherein said first color space comprises an RGB color space and wherein said steps of conversion of the density followed by conversion of the tone of an image represented by the color image data in a first color space comprise the steps of first multiplying the antilogarithmic value of each of the R, G and B components of the RGB color space by a first constant to convert density and then multiplying the antilogarithmic value of the R component of the RGB color space by a second constant, multiplying the antilogarithmic value of the G component of the RGB color space by a third constant and multiplying the antilogarithmic value of the B component of the RGB color space by a fourth constant to convert the tone, wherein the fourth constant is greater than the third constant, the third constant is greater than the second constant and the second constant is greater than one.

5. An image processing apparatus for obtaining processed image data by carrying out image processing to change density and tone on color image data, the image processing apparatus comprising:
   first conversion means for carrying out conversion of the density followed by conversion of the tone of an image represented by the color image data; and
   second conversion means for obtaining the processed image data by carrying out correction of a change in saturation and/or hue of a specific color in the image caused by the conversion of the tone, in a second color space different from the first color space.

6. An image processing apparatus as defined in claim 5, wherein the second conversion means carries out the correction so as to cause the saturation and/or the hue of the specific color to become saturation and/or hue of the specific color in the image after the conversion of the density.

7. The apparatus of claim 5 wherein said first conversion means for carrying out conversion of the density followed by conversion of the tone of an image represented by the color image data comprises first conversion means for multiplying the antilogarithmic value of each of the R, G and B components of an RGB color space by a first constant to convert density and for multiplying the antilogarithmic value of the R component of the RGB color space by a second constant, multiplying the antilogarithmic value of the G component of the RGB color space by a third constant and multiplying the antilogarithmic value of the B component of the RGB color space by a fourth constant to convert the tone, wherein the fourth constant is greater than the third constant, the third constant is greater than the second constant and the second constant is greater than one.

8. A computer-readable recording medium storing a program to cause a computer to execute a method of obtaining processed image data by carrying out image processing to change density and tone on color image data, the program comprising the procedures of:
 carrying out conversion of the density followed by conversion of the tone of an image represented by the color image data in a first color space; and
 obtaining the processed image data by carrying out correction of a change in saturation and/or hue of a specific color in the image caused by the tone conversion, in a second color space different from the first color space.

9. A computer-readable recording medium as defined in claim 8, wherein the procedure of carrying out the correction is the procedure of carrying out correction so as to change the saturation and/or the hue of the specific color to become saturation and/or hue of the specific color in the image after the conversion of the density.

10. The computer-readable recording medium storing a program of claim 8 wherein the procedure of carrying out conversion of the density followed by conversion of the tone of an image represented by the color image data in a first color space comprises the procedure of multiplying the antilogarithmic value of each of the R, G and B components of an RGB color space by a constant.

11. The computer-readable recording medium of claim 8 wherein the procedure of changing the density and/or the tone of an image represented by the color image data in the first color space comprises the step of multiplying the antilogarithmic value of the R component of an RGB color space by a first constant, multiplying the antilogarithmic value of the G component of the RGB color space by a second constant and multiplying the antilogarithmic value of the B component of the RGB color space by a third constant, wherein the third constant is greater than the second constant, the second constant is greater than the first constant and the first constant is greater than one.

12. An image processing apparatus for obtaining processed image data by carrying out image processing to change density and tone on color image data, the image processing apparatus comprising:
 a first conversion circuit carrying out conversion of the density followed by conversion of the tone of an image represented by the color image data; and
 a second conversion circuit obtaining the processed image data by carrying out correction of a change in saturation and/or hue of a specific color in the image caused by the conversion of the tone in a second color space different from the first color space.

13. An image processing apparatus for obtaining processed image data by carrying out image processing for changing density and/or tone on color image data, the image processing apparatus comprising:
 an input for receiving color image data; and
 a lookup table storing output values corresponding to values produced by carrying out conversion of the density followed by conversion of the tone of an image represented by the color image data in a first color space and carrying out correction of a change in saturation and/or hue of a specific color in the image caused by the conversion of the tone in a second color space different from the first color space.

14. An image processing method for obtaining processed image data by carrying out image processing for changing density and/or tone on color image data, the method comprising the steps of:
 changing the density and/or the tone of an image represented by the color image data in a first color space; and
 obtaining the processed image data by converting saturation and/or hue of a specific color in the image in a second color space different from the first color space;
 wherein the first color space comprises an RGB color space and wherein said step of changing the density and/or the tone of an image represented by the color image data in the first color space comprises the step of multiplying antilogarithmic values of each of the R, G and B components of the RGB color space by a constant.

15. An image processing method for obtaining processed image data by carrying out image processing for changing density and/or tone on color image data, the method comprising the steps of:
 changing the density and/or the tone of an image represented by the color image data in a first color space; and
 obtaining the processed image data by converting saturation and/or hue of a specific color in the image in a second color space different from the first color space;
 wherein said first color space comprises an RGB color space and wherein said step of changing the density and/or the tone of an image represented by the color image data in the first color space comprises the step of multiplying the antilogarithmic value of the R component of the RGB color space by a first constant, multiplying the antilogarithmic value of the G component of the RGB color space by a second constant and multiplying the antilogarithmic value of the B component of the RGB color space by a third constant, wherein the third constant is greater than the second constant, the second constant is greater than the first constant and the first constant is greater than one.

16. An image processing apparatus for obtaining processed image data by carrying out image processing for changing density and/or tone on color image data, the image processing apparatus comprising:
 first conversion means for converting the density and/or the tone of an image represented by the color image data in a first color space; and
 second conversion means for obtaining the processed image data by converting saturation and/or hue of a specific color in the image in a second color space different from the first color space;
 wherein said first conversion means for converting the density and/or the tone of an image represented by the color image data in a first color space comprises first conversion means for converting the density and/or the tone of an image represented by the color image data in an RGB color space by multiplying the antilogarithmic value of the each of the R, G, and B components by a constant.

17. A computer-readable recording medium storing a program to cause a computer to execute an image processing method for obtaining processed image data by carrying out image processing for changing density and/or tone on color image data, the program comprising the procedures of:
 changing the density and/or the tone of an image represented by the color image data in a first color space; and
 obtaining the processed image data by converting saturation and/or hue of a specific color in the image in a second color space different from the first color space;

wherein the procedure of changing the density and/or the tone of an image represented by the color image data in the first color space comprises the procedure of multiplying the antilogarithmic value of the each of the R, G and B components of an RGB color space by a constant.

18. A computer-readable recording medium storing a program to cause a computer to execute an image processing method for obtaining processed image data by carrying out image processing for changing density and/or tone on color image data, the program comprising the procedures of:

changing the density and/or the tone of an image represented by the color image data in a first color space; and obtaining the processed image data by converting saturation and/or hue of a specific color in the image in a second color space different from the first color space;

wherein the procedure of changing the density and/or the tone of an image represented by the color image data in the first color space comprises the procedure of multiplying the antilogarithmic value of the R component of an RGB color space by a first constant, multiplying the antilogarithmic value of the G component of the RGB color space by a second constant and multiplying the antilogarithmic value of the B component of the RGB color space by a third constant, wherein the third constant is greater than the second constant, the second constant is greater than the first constant and the first constant is greater than one.

* * * * *